US009411209B2

(12) United States Patent
Reynolds et al.

(10) Patent No.: US 9,411,209 B2
(45) Date of Patent: Aug. 9, 2016

(54) INFRARED-MODULATING ELECTROACTIVE DEVICES WITH VISIBLE REGION TRANSPARENCY

(75) Inventors: John R. Reynolds, Dunwoody, GA (US); Aubrey Lynn Dyer, Atlanta, GA (US)

(73) Assignee: UNIVERSITY OF FLORIDA RESEARCH FOUNDATION, INC., Gainesville, FL (US)

(*) Notice: Subject to any disclaimer, the term of this patent is extended or adjusted under 35 U.S.C. 154(b) by 96 days.

(21) Appl. No.: 14/127,702

(22) PCT Filed: Jun. 28, 2012

(86) PCT No.: PCT/US2012/044560
§ 371 (c)(1),
(2), (4) Date: Dec. 19, 2013

(87) PCT Pub. No.: WO2013/003542
PCT Pub. Date: Jan. 3, 2013

(65) Prior Publication Data
US 2015/0138621 A1    May 21, 2015

Related U.S. Application Data

(60) Provisional application No. 61/502,999, filed on Jun. 30, 2011.

(51) Int. Cl.
G02B 5/23 (2006.01)
G02F 1/15 (2006.01)
G02F 1/00 (2006.01)
G02F 1/153 (2006.01)

(52) U.S. Cl.
CPC ............ G02F 1/15 (2013.01); G02F 1/0018 (2013.01); G02F 2001/1502 (2013.01); G02F 2001/1515 (2013.01); G02F 2203/11 (2013.01)

(58) Field of Classification Search
USPC ............ 250/201.1, 216, 338.1; 359/275, 273; 427/66, 458; 528/8; 977/742; 256/586; 522/167; 524/606
See application file for complete search history.

(56) References Cited

U.S. PATENT DOCUMENTS 7,256,923 B2    8/2007    Liu et al.
2010/0253994 A1   10/2010   Cliff et al.
2010/0265562 A1*  10/2010   Reynolds et al. ............. 359/275

FOREIGN PATENT DOCUMENTS

WO    WO 2009/120658 A1 * 10/2009

OTHER PUBLICATIONS

Brenda M. Calderon, Spectral Broadening of Conjugated Polymers in Electrochromic Devices, a Thesis Presented to the Chemistry Department in the College of Liberal Arts and Sciences at the University of Florida in Partial Fulfillment of the Requirements for Graduation With Honors. University of Florida, 2011.*
Dyer, A.L. et al., A Poly(3,4-alkylenedioxythiophene) Electrochromic Variable Optical Attenuator with Near-Infrared Reflectivity Tuned Independently of the Visible Region, *Adv. Funct. Mater.*, 2007, pp. 1480-1486, vol. 17.

* cited by examiner

Primary Examiner — Bijan Ahvazi
(74) Attorney, Agent, or Firm — Saliwanchik, Lloyd & Eisenchenk

(57) ABSTRACT

An electrochromic cell includes a minimally color changing polymer (MCCP) and a non-color changing polymer (NCCP), where the neutral state or the oxidized state is highly transmissive in the NIR and the oxidized state or the neutral state, respectively, is significantly less transmissive in the NIR. An electrochromic device (ECD) can include the electrochromic cell, or a combination of electrochromic cells. The ECD can be part of a window or a laminate for a window to permit the control of IR transmittance through the window.

6 Claims, 4 Drawing Sheets

INFRARED-MODULATING ELECTROACTIVE DEVICES WITH VISIBLE REGION TRANSPARENCY

CROSS-REFERENCE TO RELATED APPLICATIONS

This application is U.S. national stage application of International Patent Application No. PCT/US2012/044560, filed Jun. 28, 2012, which claims the benefit of U.S. Provisional Application Ser. No. 61/502,999, filed Jun. 30, 2011, the disclosures of which is are incorporated by reference herein in their entirety, including any figures, tables, or drawings.

BACKGROUND OF INVENTION

Efforts to control the transmission of infrared and thermal radiation through windows in structures such as homes, office buildings, aircraft, and automobiles is of utmost interest in areas of energy savings and temperature modulation. Current technologies for such windows are generally based on low-e glass and materials that allow modulation of selected radiation, which include electrochromic, thermochromic, and photochromic materials. The most adaptable for energy savings applications, in an actively controlled manner, is based on electrochromics. These windows are based on two transparent electrodes onto which electrochromic active materials are coated, with an electrolyte separating the coated electrochromic materials. The electrochromic materials that have been explored include metal oxides, small organic molecules, and conjugated polymers. These windows do not allow tunable control of IR transmission, independent of visible region modulation.

The operating principle for electrochromic cells is similar to that of a battery, where one electrochrome-coated electrode acts as an electrode, for example, an anode, and the other acts as a counter electrode, for example, a cathode. Most high-contrast cells comprise an actively coloring material at the anode and a charge balancing material at the cathode, where the charge balancing material displays complementary coloring properties to the coloring material, or exhibits little or no color change. Typically, when no voltage is applied to the electrochromic cell, absorption of radiation occurs in the visible region and the cell is in a colored state. When a positive voltage is applied to the cell, a bleached state with high transmission in the visible region is achieved.

Operation of the cell requires complementary materials, where one is oxidized and the other is reduced. State of the art electrochromic windows have a visible region optical modulation that is rather high, while long wavelength (NIR and IR) optical changes are minimal, where one of the materials is always highly IR absorptive during device operation. As such, there is a large amount of visible light modulation, with the window switching between tinted and non-tinted states, providing limited privacy and glare reduction, but allowing little ability to actively modulate thermal radiation. FIG. 1 illustrates this modulation for a typical electrochromic device based on a conjugated polymer electrochrome at one electrode (ECP-black) and a minimally coloring material (MCCP) at the counter electrode, where the device has a high contrast in the visible region (40% ΔT at 555 nm), but little contrast in the NIR (18% ΔT at 1200 nm and 4.2% at 2000 nm). This pairing of materials results in maximal transmittance of NIR radiation when the device is least visibly light transmissive, which is contrary to what one would desire for a window to attenuate heat from sunlight on a warm day, yet allowing transmission of NIR radiation on cold days and thermal control in the evening when visible light modulation is not as important.

Hence there remains a need for a device that can modulate IR radiation for heat control in structures and vehicles including buildings, automobiles, and airplanes. Typically, during a hot day, it is desirable to keep the indoor cooling costs to a minimum. Therefore, a window that has high IR absorption is desired. In contrast, on a cold day, it is advantageous to have a window with low IR absorption to keep indoor heating costs to a minimum. Therefore, an electrochromic cell that allows control over IR transmission with little to no visible light variation is desirable.

BRIEF SUMMARY

Embodiments of the invention are directed to IR modulating electrochromic cells for control of IR transmission with little change of visible transmission through the cell. The cell includes a minimally color changing polymer (MCCP) that changes in transmission by more than 20% in the near IR and/or IR, for example, upon changing from the neutral to the oxidized states, but changes less than 15% in the visible. The MCCP electrically contacts at least one electrode and electrically contacts a non-color changing polymer (NCCP), which electrically contacts at least one counter electrode. The NCCP displays little change in the visible, near IR, or IR when switched between the neutral and oxidized states. The MCCP can be a poly(N-substituted alkylenedioxypyrrole), such as a poly(N-alkyl substituted ethylenedioxypyrrole), a poly(N-alkyl substituted propylenedioxypyrrole), or a copolymer thereof. The NCCP can be a polymer having a redox-active 2,2,6,6-tetramethylpiperidin-N-oxyl (TEMPO) group in some or all of the repeating units. Poly(2,2,6,6-tetramethylpiperidinyloxy-4-yl methacrylate) (PTMA) can be used as the NCCP.

According to an embodiment of the invention, an electrochromic device (ECD) comprises the IR modulating electrochromic cells. The ECD can have the MCCP on a single electrode and the NCCP on a single counter electrode. In another embodiment of the invention the ECD comprises two coupled electrochromic cells, where two MCCPs reside on two anodes and a NCCP is on or within a single cathode situated between the two anodes. The single cathode can be porous, with the NCCP situated within the pores of the cathode, or the NCCP can be situated on one or both faces of the cathode. The ECD can be a window for a building or a vehicle and can be a laminate for attachment to the window.

DETAILED DISCLOSURE

Embodiments of the invention are directed to an electrochromic cell that has little difference in transmission in the visible region (having little or no visible electrochromism) during switching between a neutral and oxidized state, but has a large tunable NIR and IR change when switched between the neutral and oxidized states. Electrochemical cells, according to an embodiment of the invention, achieve this NIR and IR electrochromic behavior by the use of an active component of the device being a minimally-color changing polymer (MCCP), which is IR electrochromic, deposited on the anode and a non-color changing polymer (NCCP), which is inactive in both the visible and the infrared, deposited on the cathode of the cell. In an embodiment of the invention, the MCCP is a poly(N-substituted alkylenedioxypyrrole). The poly(N-substituted alkylenedioxypyrrole) can be a poly(N-alkyldioxypyrrole), where the N-alkyl group can be a $C_1$ to $C_{30}$ alkyl group terminated with an alkyl, sulfonate, aryl, or nitrile functionality. The N-substitution can be an oligo or polyether substituent, for example, a $N-[(CH_2CH_2O)_x-(CHCH_3CH_2O)_y]_nR$ where x and y are independently 0 to 20 on average, n is 1 to 20, and R is H, alkyl, aryl, nitrile, or propylsulfonate, where the propylsulfonate is ion paired with an alkali metal or an ammonium ion, or is alkylated with a $C_1$ to $C_{20}$ alkyl group. The alkylenedioxypyrrole can be a substituted or unsubstituted ethylenedioxypyrrole, propylenedioxypyrrole, butylenedioxypyrrole or similar derivative. The NCCP can be a polymer bearing a redox-active 2,2,6,6-tetramethylpiperidin-N-oxyl (TEMPO) group, such as a polynorborene, polymethaerylate, polyacrylamide, or polylactide, among others, for example, poly(2,2,6,6-tetramethylpiperidinyloxy-4-yl methacrylate) (PTMA).

Figure 1:
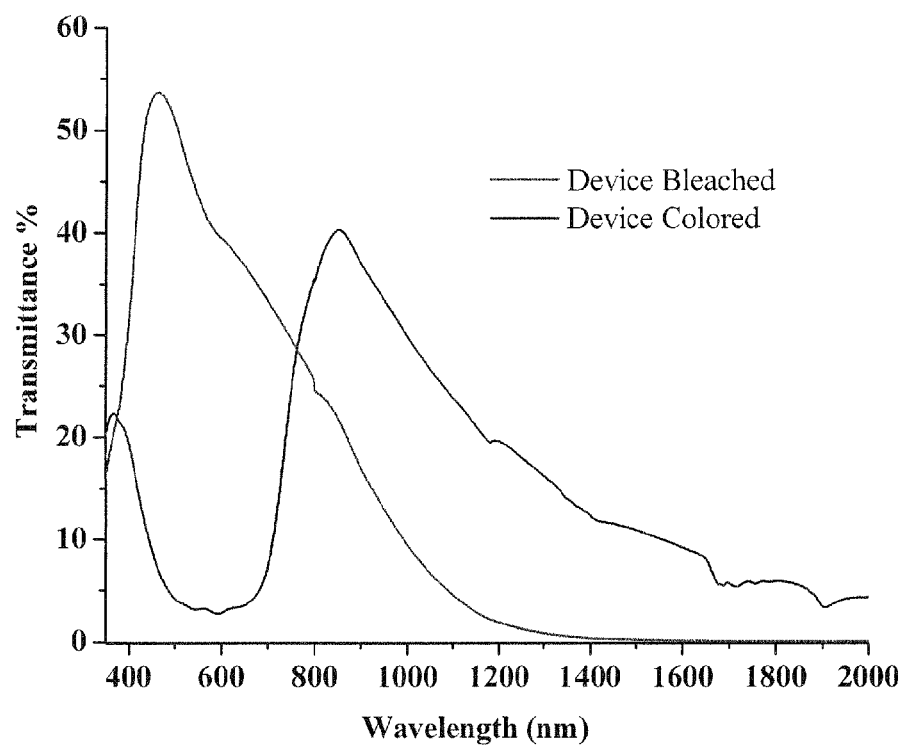
FIG. 1 shows a plot of transmittance against wavelength for a prior art black-to-clear switching electrochromic device in a bleached state and a colored state, where the device is constructed using a black to transmissive electrochromic polymer (ECP-black) on a glass supported ITO anode and PProDOP-C18 (MCCP) on a glass supported ITO cathode.
Figure 2:
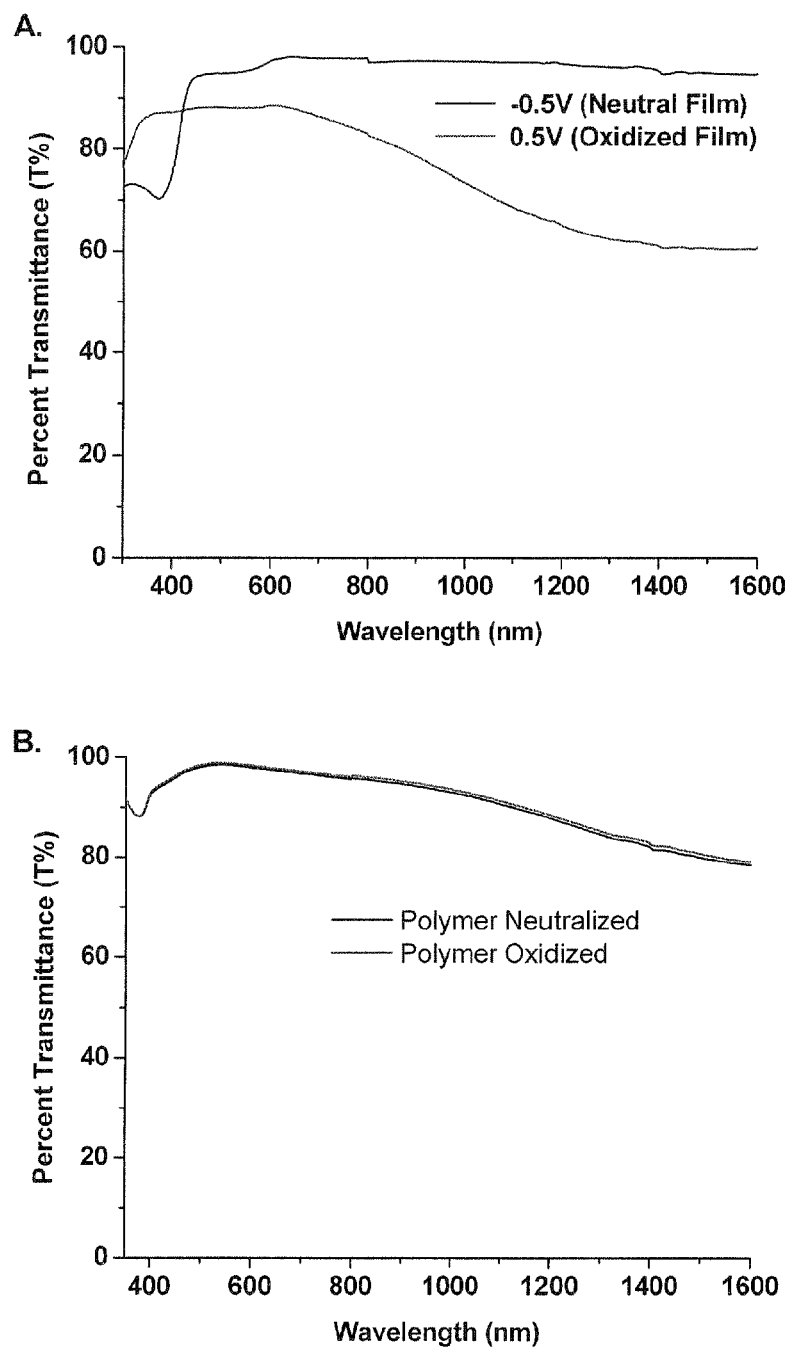
FIG. 2 shows plots of percent transmittance against wavelength of spray-cast films of A) poly(N-octadecyl-propylenedioxypyrrole) (PProDOP-N-C18) and B) poly(2,2,6,6-tetramethylpiperidinyloxy-4-yl methacrylate) (PTMA) on ITO electrodes at neutralizing and oxidizing potentials, according to an embodiment of the invention.

In an exemplary embodiment of the invention, the MCCP can be poly(N-octadecyl-propylenedioxypyrrole) (PProDOP-N-C18) and the NCCP can be PTMA. Spectroelectrochemical characteristics of the anodic coloring MCCP for the exemplary electrochromic cell is shown in FIG. 2a, where little visible region modulation (7.5% ΔT at 555 nm) between the neutral and oxidized states occurs, but a significantly larger difference of 34% is observed in the NIR at 1600 nm. The NCCP, PTMA, displays no optical modulation in the visible or IR portions of the spectrum as shown in FIG. 2b.

Figure 3:
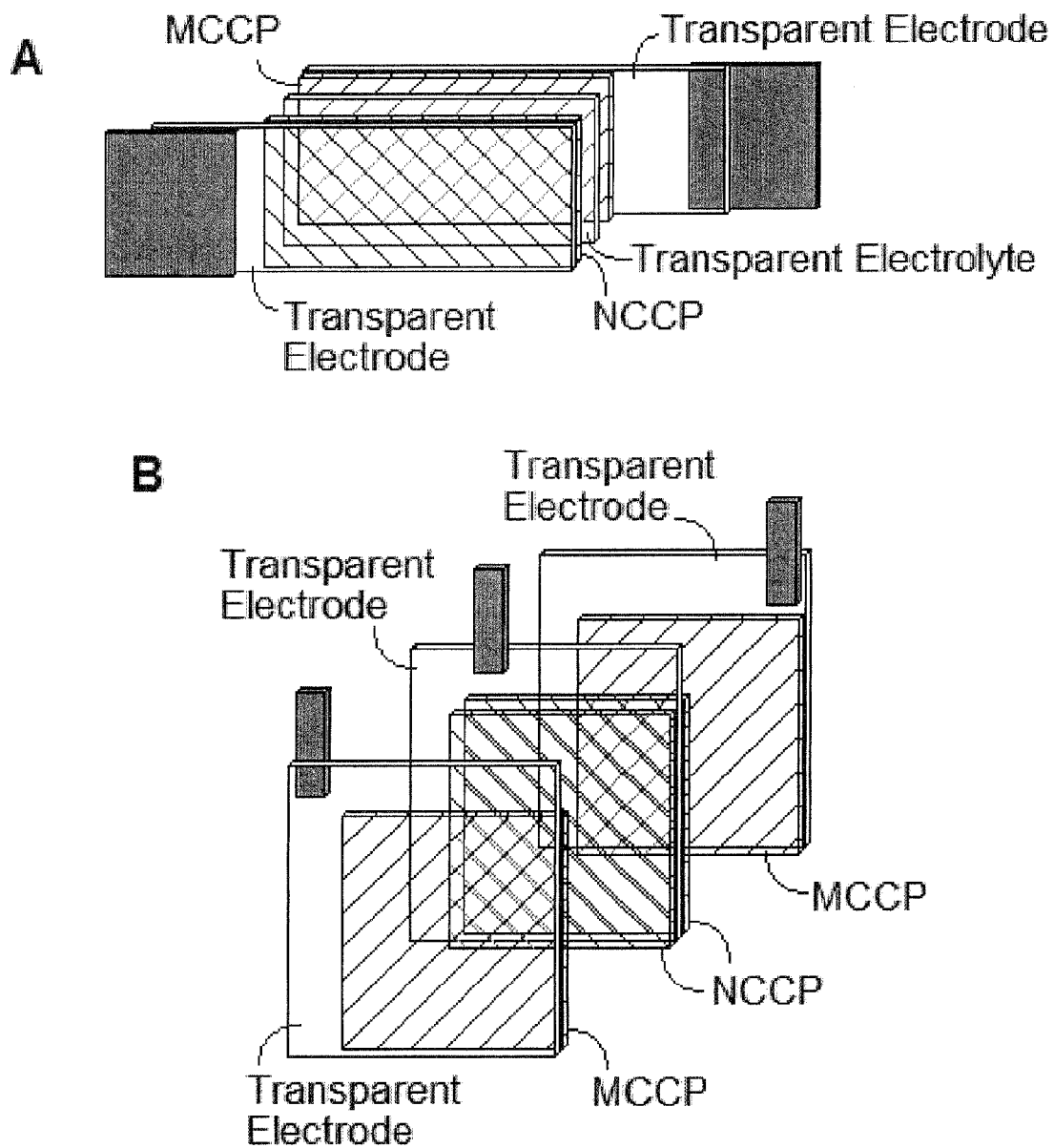
FIG. 3 shows A) a 2-electrode cell with a MCCP as the IR active anode electrochromic material and a NCCP as the cathode material, according to an embodiment of the invention, and B) a 3-electrode electrochromic device (ECD) having a MCCP on a pair of anodes and a NCCP on a double-sided transmissive cathode, according to an embodiment of the invention.

In an embodiment of the invention, the MCCP and the NCCP can be combined in a simple 2-electrode electrochromic device (ECD), as shown schematically in FIG. 3A for a cell comprising PProDOP-N-C18 and PTMA. Summation of the neutral and oxidized spectra of FIG. 2 indicates that an ECD, such as that shown in FIG. 3A, has the spectral characteristics shown in FIG. 4A, with a NIR contrast of 26% at 1600 nm and a 10% contrast in the visible at 555 nm. For this ECD, absorption of both the visible and the NIR radiation in the oxidized state is greater than is the absorption in the neutral state.

Figure 4:
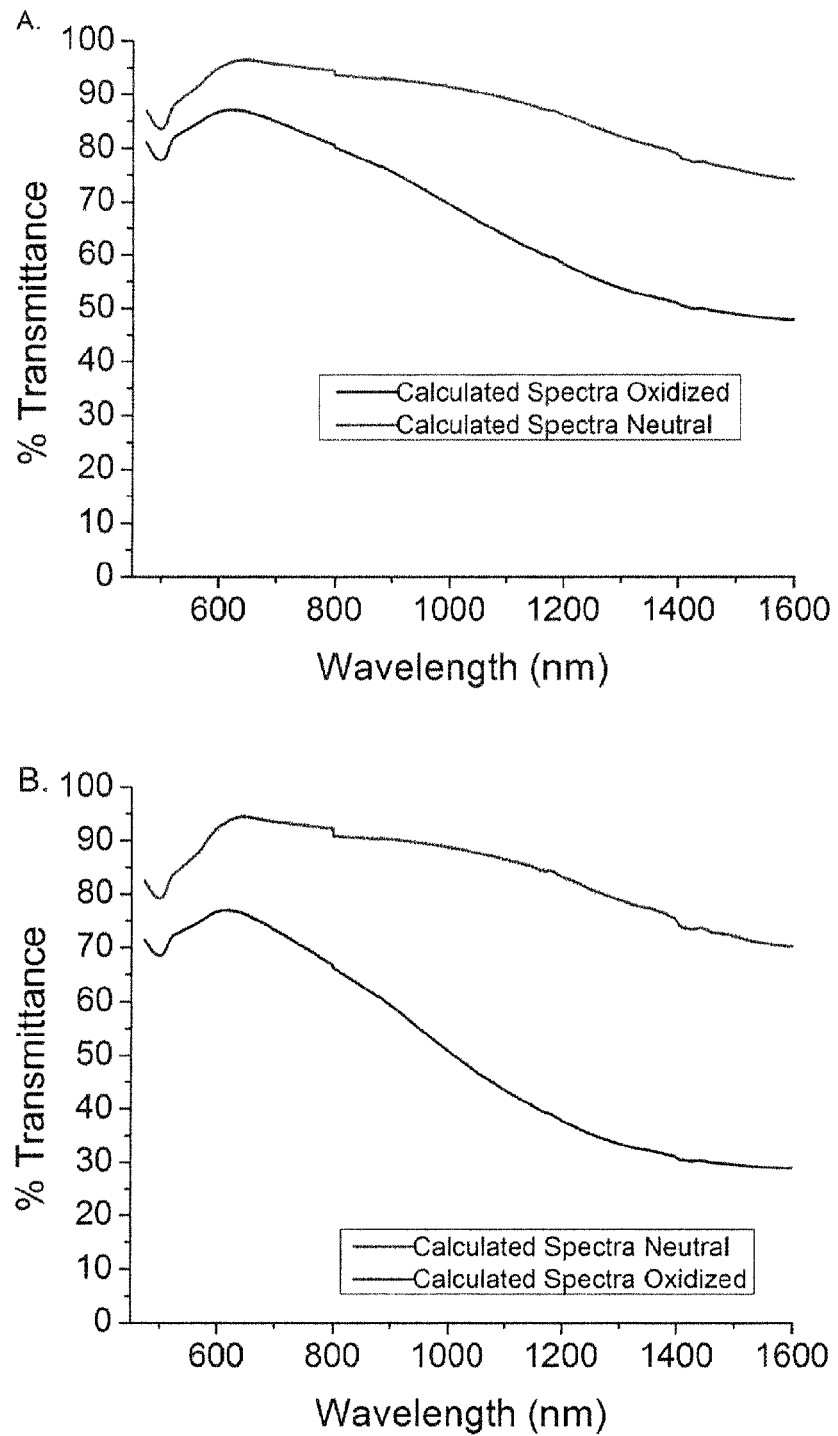
FIG. 4 shows composite spectra for MCCP (PProDOP-N-C18) anode and NCCP (PTMA) cathode materials in the neutral and oxidized state for A) a 2-electrode cell as shown in FIG. 3A and for B) a 3-electrode device as shown in FIG. 3B according to embodiments of the invention.

In another embodiment of the invention, a 3-electrode electrochromic device, as shown in FIG. 3B, can be constructed to increase the contrast of the cell. The 3-electrode ECD has two MCCP (PProDOP-N-C18) coated anodes that are coupled with a central cathode coated with an NCCP (PTMA) on each side. The 3-electrode ECD is the optical equivalent of two coupled 2-electrode electrochromic cells by using the common counter electrode. In this manner, as can be seen in FIG. 4B, the contrast in the IR and NIR increases relative to that for the single 2-electrode electrochromic cell, as shown in FIG. 4A, where NIR contrast at 1600 nm doubles to 52% while the contrast at 555 nm increases by only 14% in the 3-electrode device.

Electrochromic cells and devices, according to embodiments of the invention, include at least one electrolyte layer situated between the polymers on the anodes and the cathodes. The electrolyte layers can be can be a gel electrolyte, a solid electrolyte, or an ionic liquid. In one embodiment of the invention, the electrolyte layer is a gel electrolyte, such as a propylene carbonate (PC) solution containing poly(methyl methacrylate) and the salt $LiClO_4$. In another embodiment of the invention, the electrolyte layer be a solid state electrolyte. Solid electrolytes include polar polymer hosts, such as poly (ethylene oxide), poly(propylene oxide), methoxyethoxyethoxy substituted polyphosphazene, polyether based polyurethanes, and other similar polymers that are able to dissolve metal salts and give ionically conducting complexes. Typical metal salts include alkali cations, including $Li^+$, $Na^+$, $K^+$, and $Cs^+$, with non-nucleophilic anions, including but not limited to tetrafluoroborate, perchlorate, triflate, and bis(trifluoromethylsulfonyl)imide. Room temperature conductivities of $10^{-5}$ to $10^{-4}$ S/cm are typically attained, and are adequate for most applications of the invention.

In the exemplary embodiments of the invention, the electrodes contacting the MCCP and NCCP comprise indium-tin-oxide (ITO), which limits transmittance in the NIR and mid-IR if the ITO has a low surface resistance. As observed in FIG. 2, although small, some of the lack of transmittance in the NIR and IR results from reflectance by thin ITO electrodes.

An ECD, according to embodiments of the invention, can be part of a window, where the substrate for one or both of the electrodes can be a glass that has high transmittance of visible and NIR light. The ECD can be a 2-electrode device, as shown in FIG. 3A, or a 3-electrode device, as shown in FIG. 3B. The substrate can be a glass or a plastic material. In an embodiment of the invention, the window can include two or more ECDs. In one embodiment of the invention, the ECD is a flexible laminate where the substrate for the electrodes is a flexible plastic. Flexible plastics include polyethylene (PE), polypropylene (PP), poly(ethylene terephthalate) (PET), poly(ethylene naphthalates) (PEN)), poly(phenylene sulfide) (PPS), polycarbonate (PC), a polysulfone, a polyethersulfone, poly(methylmethacrylate) (PMMA), polybutadiene, polyisoprene and/or a silicone.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. An IR modulating electrochromic cell, consisting essentially of a minimally color changing polymer (MCCP) selected from poly(N-alkyl substituted ethylenedioxypyrrole), a ploy(N-alkyl substituted propylenedioxypyrrole), or a copolymer thereof contacting an electrode and a non-color changing polymer (NCCP), wherein the polymer comprises a 2,2,6,6-tetramethylpiperidin-N-oxyl (TEMPO) group contacting a counter electrode, wherein the MCCP's transmissivity changes by more than 20% in the near IR and/or IR but changes less than 15% in the visible upon changing from the neutral to the oxidized states, and wherein the NCCP undergoes little or no transmissivity change in the visible, near IR, or IR upon changing from the neutral to the oxidized states.

2. The electrochromic cell of claim 1, wherein the poly(N-alkyl substituted propylenedioxypyrrole) is poly(N-octadecyl-propylenedioxypyrrole) (PProDOP-N-C18).

3. The electrochromic cell of claim 1, wherein the polymer comprising a redox-active 2,2,6,6-tetramethylpiperidin-N-oxyl (TEMPO) group is poly(2,2,6,6-tetramethylpiperidinyloxy-4-yl methacrylate) (PTMA).

4. An electrochromic device (ECD), comprising at least one electrochromic cell according to claim 1.

5. The ECD of claim 4, wherein the device is a window for a building or a vehicle.

6. The ECD of claim 4, wherein the device is a laminate for a window.

* * * * *